United States Patent
Ueno et al.

(10) Patent No.: US 9,690,150 B2
(45) Date of Patent: Jun. 27, 2017

(54) ELECTRO-OPTICAL DISPLAY DEVICE

(71) Applicant: Mitsubishi Electric Corporation, Tokyo (JP)

(72) Inventors: Takahiro Ueno, Kumamoto (JP); Takayuki Fukuda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/057,722

(22) Filed: Mar. 1, 2016

(65) Prior Publication Data
US 2016/0299386 A1    Oct. 13, 2016

(30) Foreign Application Priority Data
Apr. 10, 2015   (JP) ................................ 2015-081021

(51) Int. Cl.
G02F 1/1333    (2006.01)
G02F 1/1345    (2006.01)

(52) U.S. Cl.
CPC ...... *G02F 1/13452* (2013.01); *G02F 2201/50* (2013.01)

(58) Field of Classification Search
CPC .......... G02F 1/13452; G02F 1/133305; G02F 2201/50
See application file for complete search history.

(56) References Cited

U.S. PATENT DOCUMENTS

| | | | | |
|---|---|---|---|---|
| 2009/0115942 A1* | 5/2009 | Watanabe | ......... | G02F 1/133305 349/96 |
| 2014/0036181 A1* | 2/2014 | Kamon | ................. | H05K 1/118 349/33 |
| 2014/0043577 A1* | 2/2014 | Kim | ........................ | H05K 1/11 349/150 |
| 2015/0327355 A1* | 11/2015 | Wolfel | ................. | H05K 1/0278 174/251 |
| 2016/0073495 A1* | 3/2016 | Happoya | .............. | H05K 1/0281 174/254 |
| 2016/0162062 A1* | 6/2016 | Furukawa | ............... | G06F 3/041 345/173 |

(Continued)

FOREIGN PATENT DOCUMENTS

JP    60-67984 A    4/1985
JP    03-150531 A    6/1991
(Continued)

*Primary Examiner* — Timothy L Rude
(74) *Attorney, Agent, or Firm* — Studebaker & Brackett PC (57) ABSTRACT

An electro-optical display device according to the present invention includes a TFT substrate having a first electrode; a flexible circuit substrate extended in such a way as to protrude outwardly from the TFT substrate, wherein a second electrode is formed at the flexible circuit substrate and is connected to the electrode; a reinforcement plate which is extended from the TFT substrate to the flexible circuit substrate in such a way as to cover portions of the first electrode and the second electrode which are connected to each other and, further, is protruded from the flexible circuit substrate; and a resin formed to extend over a portion of a surface of the flexible circuit substrate which is protruded from the substrate, a portion of a surface of the reinforcement plate which is protruded from the flexible circuit substrate, and an end surface of the TFT substrate.

6 Claims, 5 Drawing Sheets

(56) References Cited

U.S. PATENT DOCUMENTS

2016/0205765 A1\* 7/2016 Takagi ................ H05K 1/0215
174/254

FOREIGN PATENT DOCUMENTS

| | | |
|---|---|---|
| JP | 05-038630 U | 5/1993 |
| JP | 08-001496 B2 | 1/1996 |
| JP | 08-062095 A | 3/1996 |
| JP | 10-054992 A | 2/1998 |
| JP | 2005-038635 A | 2/2005 |
| JP | 2007-281378 A | 10/2007 |

\* cited by examiner

ELECTRO-OPTICAL DISPLAY DEVICE

BACKGROUND OF THE INVENTION

Field of the Invention

The present invention relates to electro-optical display devices. As examples of electro-optical display devices, there are flat-panel display devices represented by liquid crystal display devices, plasma display devices, organic Electro Luminescence (EL) display devices, field emission display devices, for example. Further, as other examples of electro-optical display devices, there are touch panel display devices including touch panels provided in flat-panel display devices as described above.

Description of the Background Art

Recently, among electro-optical display devices which have been used in a wide variety of applications, for example, liquid crystal display devices have been used in various environments and, particularly, have been increasingly used in corrosive gas atmospheres. Such liquid crystal display devices include display panels incorporating electrodes and various electronic components, and there have been concerns raised about degradation of the functions of these electrodes and these electronic components due to corrosive gasses.

As countermeasures against the aforementioned problem, conventionally, there have been disclosed techniques for protecting electrodes and electronic components provided on display panels through resins applied to the surfaces of the electrodes and the electronic components (refer to Japanese Patent Application Laid-Open No. 10-54992(1998), for example). Further, there have been disclosed techniques for attaching reinforcement plates and the like to electrodes and electronic components provided in display panels for forming protective layers (refer to Japanese Patent Application Laid-Open No. 2007-281378, for example).

In Japanese Patent Application Laid-Open No. 10-54992 (1998), a polarization plate is provided in such a way as to protrude from a substrate and, between the polarization plate and the substrate, a resin is embedded on the surface of a terminal of an electrode on the substrate and on the surface of the portion connecting the terminal of the electrode on the substrate to a flexible substrate printed substrate, in order to protect the terminal of the electrode on the substrate and the portion connecting the terminal of the electrode on the substrate to the flexible substrate printed substrate (refer to FIG. 1 in Japanese Patent Application Laid-Open No. 10-54992(1998), for example). However, the resin cannot be sufficiently embedded on an electrode formed on the flexible printed substrate protruded from the embedded-resin portion, particularly on the connection portion thereon, which makes it impossible to completely prevent intrusion of corrosive gas through the cut surfaces of the flexible printed substrate, which are the side surfaces thereof. This has induced the problem of corrosion of the electrode on the flexible substrate due to corrosive gas, thereby inducing the problem of degradation of the quality of the display.

In Japanese Patent Application Laid-Open No. 2007-281378, a reinforcement copper foil as a reinforcement plate is provided on a flexible wiring substrate (see FIG. 1 in Japanese Patent Application Laid-Open No. 2007-281378, for example). However, Japanese Patent Application Laid-Open No. 2007-281378 aims at preventing breakage of wiring of an electrode on the flexible wiring substrate due to mechanical stresses, and cannot prevent intrusion of corrosive gas as described above.

SUMMARY OF THE INVENTION

It is an object of the present invention to provide an electro-optical display device capable of preventing intrusion of corrosive gas therein.

An electro-optical display device includes: a substrate having a peripheral edge portion on which a first electrode is formed; a flexible circuit substrate extended in such a way as to protrude outwardly from the substrate beyond the peripheral edge portion of the substrate, wherein a second electrode is formed at an end portion of the flexible circuit substrate and is connected to the first electrode; a reinforcement plate which is extended from the substrate to the flexible circuit substrate in such a way as to cover portions of the first electrode and the second electrode which are connected to each other at said portions and, further, is protruded from the flexible circuit substrate at its opposite side surfaces along a direction of this extension; and a first resin formed to extend over a portion of a surface of the flexible circuit substrate which is in an opposite side from the reinforcement plate and is protruded from the substrate, a portion of a surface of the reinforcement plate which is closer to the flexible circuit substrate and is protruded from the flexible circuit substrate, and an end surface of the substrate.

According to the present invention, an electro-optical display device includes a substrate having a peripheral edge portion on which a first electrode is formed; a flexible circuit substrate extended in such a way as to protrude outwardly from the substrate beyond the peripheral edge portion of the substrate, wherein a second electrode is formed at an end portion of the flexible circuit substrate and is connected to the first electrode; a reinforcement plate which is extended from the substrate to the flexible circuit substrate in such a way as to cover portions of the first electrode and the second electrode which are connected to each other at said portions and, further, is protruded from the flexible circuit substrate at its opposite side surfaces along a direction of this extension; and a first resin formed to extend over a portion of a surface of the flexible circuit substrate which is in an opposite side from the reinforcement plate and is protruded from the substrate, a portion of a surface of the reinforcement plate which is closer to the flexible circuit substrate and is protruded from the flexible circuit substrate, and an end surface of the substrate. Accordingly, it is possible to prevent intrusion of corrosive gas therein.

These and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter, preferred embodiments of the present invention will be described, with reference to the drawings.

First Preferred Embodiment

In the first preferred embodiment of the present invention, there will be described a liquid crystal display device as an example of an electro-optical display device.

Figure 1:
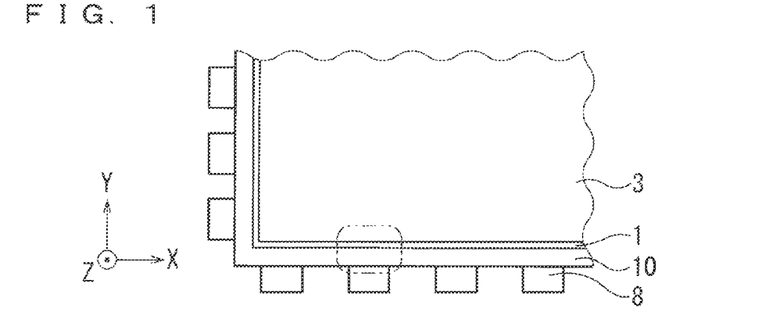
FIGS. 1 and 2 are plan views each illustrating an example of the structure of a liquid crystal display device according to a first preferred embodiment of the present invention.
Figure 2:
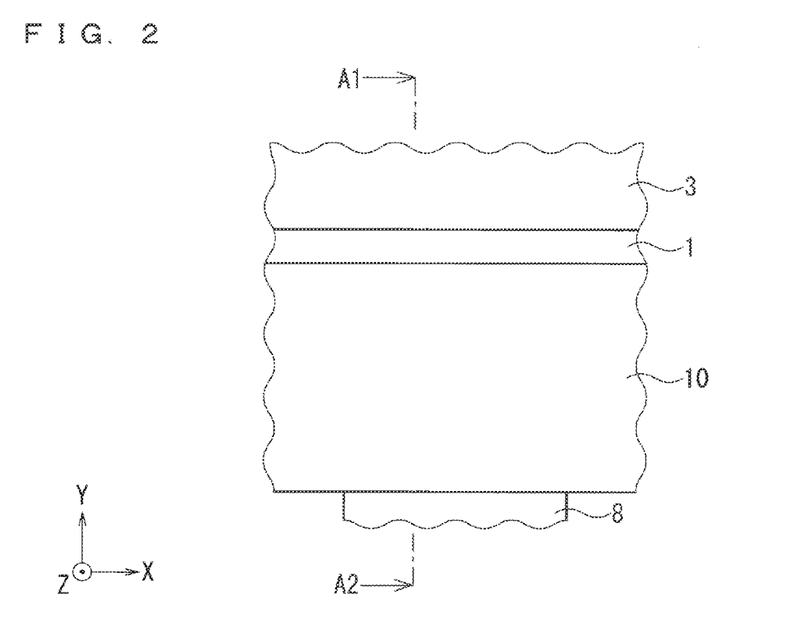
Figure 3:
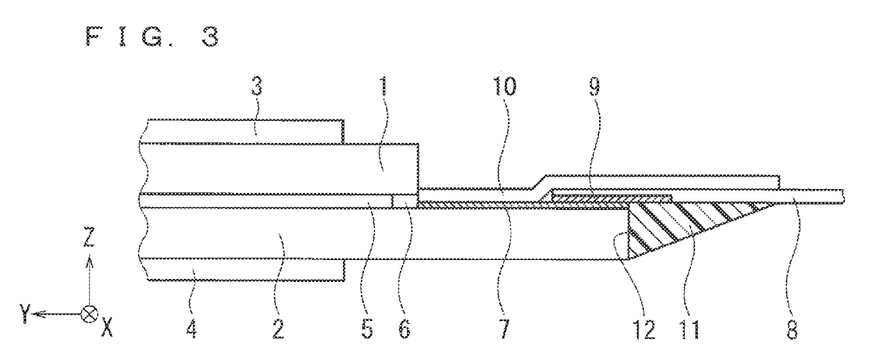
FIG. 3 is a cross-sectional view illustrating the example of the structure of the liquid crystal display device according to the first preferred embodiment of the present invention.
Figure 4:
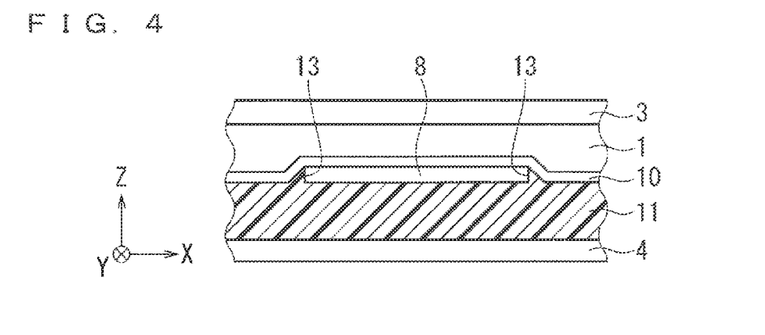
FIG. 4 is a side view illustrating the example of the structure of the liquid crystal display device according to the first preferred embodiment of the present invention.

FIG. 1 is a plan view illustrating an example of the structure of the liquid crystal display device according to the first preferred embodiment of the present invention, illustrating a portion of the structure of the liquid crystal display device. FIG. 2 is an enlarged view of the portion encircled by a broken line in FIG. 1. FIG. 3 is a cross-sectional view taken along A1-A2 in FIG. 2. FIG. 4 is a side view in the −Y-axis direction in FIGS. 2 and 3.

The liquid crystal display device according to the present first preferred embodiment includes a Color Filter (CF) substrate 1, a Thin Film Transistor (TFT) substrate 2, and a liquid crystal 5 sealed by a seal member 6 between the CF substrate 1 and the TFT substrate 2. A CF polarization plate 3 is provided on the surface of the CF substrate 1 which is in the opposite side from the liquid crystal 5, and a TFT polarization plate 4 is provided on the surface of the TFT substrate 2 which is in the opposite side from the liquid crystal 5.

An electrode 7 (first electrode) is formed on the surface of the TFT substrate 2 which is closer to the CF substrate 1, at a portion outside the seal member 6 (a peripheral edge portion of the TFT substrate 2). A flexible circuit substrate 8 is connected to the electrode 7 formed on the TFT substrate 2, at an electrode 9 (second electrode) formed at an end portion thereof, and, further, is extended in such a way as to protrude outwardly from the TFT substrate 2 (in such a way as to protrude in the −Y-axis direction) beyond the peripheral edge portion of the TFT substrate 2. Further, as the flexible circuit substrate 8, it is possible to employ a Chip On Film (COF), a Flexible Printed Circuit (FPC), or the like, for example.

A reinforcement plate 10 is extended from the TFT substrate 2 to the flexible circuit substrate 8 in such a way as to cover the portions of the electrode 7 and the electrode 9 which are connected to each other. The reinforcement plate 10 has a width in the X-axis direction which is larger than the width of the flexible circuit substrate 8 in the X-axis direction. Namely, the reinforcement plate 10 is protruded from the flexible circuit substrate 8, at its opposite side surfaces along the direction of the extension thereof (the Y-axis direction).

A resin 11 (first resin) is formed (embedded) to extend over the surface of the flexible circuit substrate 8 which is in the opposite side from the reinforcement plate 10 (in the side in the −Z-axis direction) at its portion protruded from the TFT substrate 2, the surface of the reinforcement plate 10 which is closer to the flexible circuit substrate 8 at its portion protruded from the flexible circuit substrate 8, and the cut surface 12 (the end surface) of the TFT substrate 2.

The CF substrate 1 and the TFT substrate 2 are mainly formed from a base member, which is an insulating member or the like which contains a glass, a plastic, or a resin of a film-type or other types, for example. The electrode 7 and the electrode 9 are electric-conductive members made of a metal or the like. The resin 11 is an insulating member. The reinforcement plate 10 is an adhesive film or the like, for example, and is a base member made of an insulating member or a base member subjected to insulating processing at its surface to come in contact with the base member or the electrode 7. Further, in cases where the flexible circuit substrate 8 is configured to be bendable at the portion where the electrode 7 and the electrode 9 are connected to each other (at the peripheral edge portion of the TFT substrate 2), the reinforcement plate 10 is formed from a flexible material with a smaller thickness, such as a film-type material. Further, although the reinforcement plate 10 is provided along the foundation (along the surfaces of the electrode 7 and the flexible circuit substrate 8) as illustrated in FIGS. 3 and 4, it can be also formed from a hard material (rigid).

As illustrated in FIGS. 3 and 4, since the reinforcement plate 10 is provided, it is possible to efficiently embed the resin 11 on the cut surface 12 of the TFT substrate 2 and on the cut surfaces 13 of the flexible circuit substrate 8. More specifically, the resin 11 is directly adhered to both the cut surface 12 of the TFT substrate 2 and the back surface of the reinforcement plate 10 at its portion protruded from the flexible circuit substrate 8 and, thus, the resin 11 remains thereon, so that the resin 11 forms a resin layer covering the cut surfaces 13 of the flexible circuit substrate 8. Namely, the resin 11 forms a resin layer (protective layer) effective in preventing intrusion of corrosive gas into the electrodes 7 and 9 through the cut surfaces 13 of the flexible circuit substrate 8 or through the adhesion boundary between the resin 11 and the cut surfaces 13 of the flexible circuit substrate 8. Further, preferably, the resin 11 has relatively-higher viscosity, such that it can easily remain extending over the cut surface 12 of the TFT substrate 2 and the back surface of the reinforcement plate 10 at its portion protruding from the flexible circuit substrate 8.

<Comparative Example>

Next, there will be described a comparative example for explaining effects of the liquid crystal display device according to the present first preferred embodiment.

Figure 5:
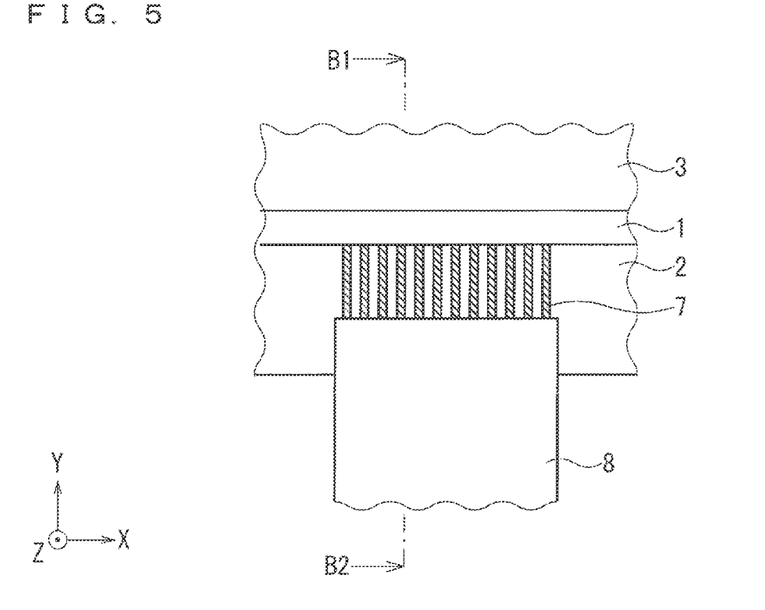
FIG. 5 is a plan view illustrating an example of the structure of a liquid crystal display device in a comparative example regarding the first preferred embodiment of the present invention.
Figure 6:
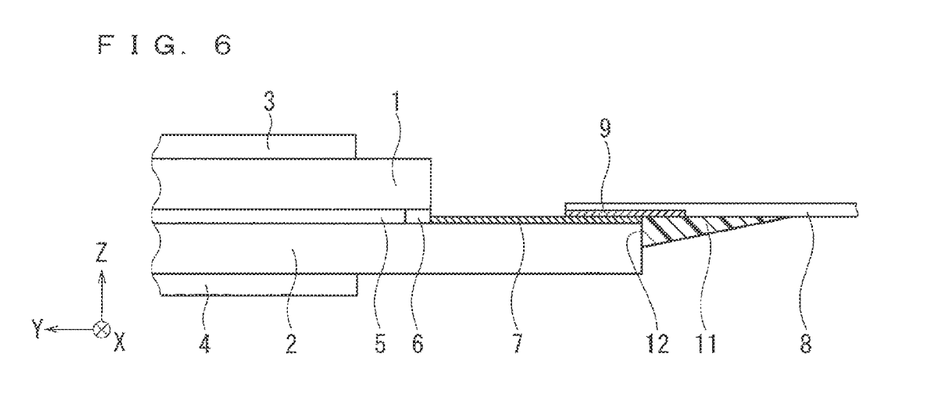
FIG. 6 is a cross-sectional view illustrating the example of the structure of the liquid crystal display device in the comparative example regarding the first preferred embodiment of the present invention.
Figure 7:
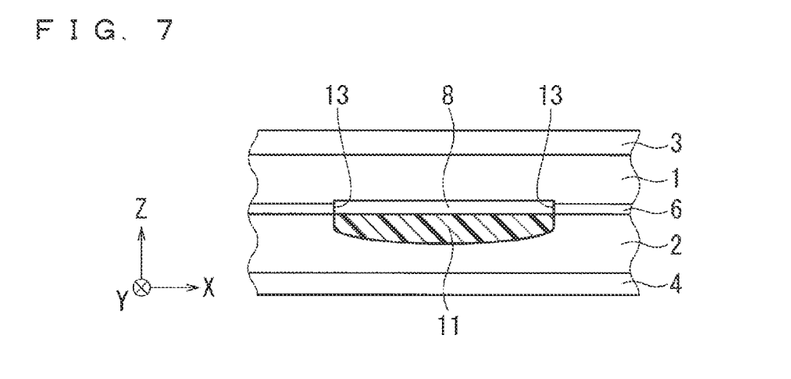
FIG. 7 is a side view illustrating the example of the structure of the liquid crystal display device in the comparative example regarding the first preferred embodiment of the present invention.

FIG. 5 is a plan view illustrating an example of the structure of a liquid crystal display device in the comparative example. FIG. 6 is a cross-sectional view taken along B1-B2 in FIG. 5. FIG. 7 is a side view in the −Y-axis direction in FIGS. 5 and 6.

As illustrated in FIGS. 5 to 7, in the comparative example, a reinforcement plate 10 as illustrated in FIGS. 1 to 4 is not provided. Accordingly, a resin 11 is formed in such a way as to cover only the surface of a flexible circuit substrate 8 in its back surface side (in the side in the −Z-axis direction), thereby bringing the flexible circuit substrate 8 into the state of being exposed at its cut surfaces 13. Further, in the comparative example, it is impossible to cause the resin 11 to efficiently remain on the cut surface 12 of a TFT substrate 2, which makes it impossible to prevent intrusion of corrosive gas into electrodes 7 and 9 through the cut surfaces 13 of the flexible circuit substrate 8 or through the adhesion boundary between the resin 11 and the cut surfaces 13 of the flexible circuit substrate 8.

In view of the aforementioned fact, according to the present first preferred embodiment, since the reinforcement plate 10 is provided in such a way as to cover the portion of the electrode 7 formed on the TFT substrate 2 and the portion of the electrode 9 formed in the flexible circuit substrate 8 which are connected to each other, and in such a way as to protrude from the flexible circuit substrate 8, it is possible to cause the resin 11 to remain being sufficiently embedded on the cut surfaces 13 of the flexible circuit substrate 8, which can efficiently prevent intrusion of corrosive gas into the electrodes 7 and 9 through the cut surfaces 13 of the flexible circuit substrate 8. Accordingly, it is possible to suppress degradation of the quality of the display on the electro-optical display device (the liquid crystal display device in the present first preferred embodiment).

Further, since the reinforcement plate 10 is provided in such a way as to protrude from the flexible circuit substrate 8, the resin 11 embedded on the cut surface 12 of the TFT substrate 2 can easily remain thereon, which causes the resin 11 to have an increased thickness, thereby efficiently preventing intrusion of corrosive gas into the electrodes 7 and 9 through the cut surfaces 13 of the flexible circuit substrate 8.

Further, since the reinforcement plate 10 is provided in such a way as to cover the portions of the electrode 7 and the electrode 9 which are connected to each other, the reinforcement plate 10 functions as a protective layer for protecting the surface of the flexible circuit substrate 8, thereby preventing intrusion of corrosive gas through the surface of the flexible circuit substrate 8.

<Modification Example>

Next, an example of modification of the present first preferred embodiment will be described.

Figure 8:
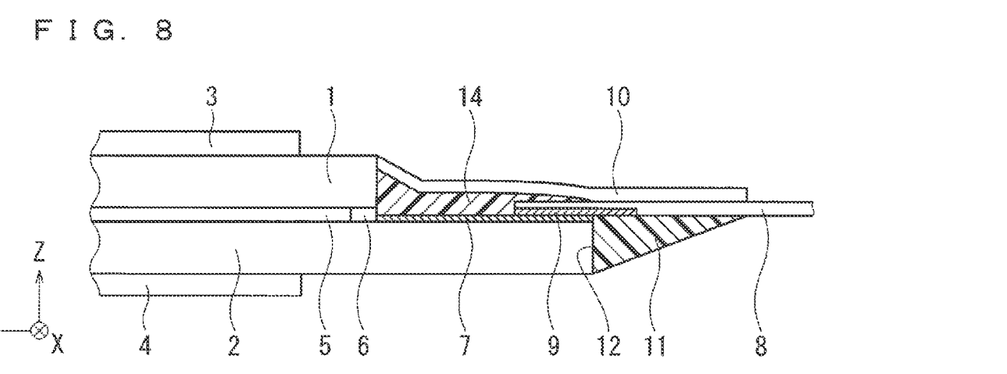
FIG. 8 is a cross-sectional view illustrating the example of the structure of the liquid crystal display device in the modification example regarding the first preferred embodiment of the present invention.

FIG. 8 is a cross-sectional view illustrating an example of the structure of a liquid crystal display device in the modification example. Further, FIG. 8 corresponds to FIG. 3.

As illustrated in FIG. 8, the liquid crystal display device in the modification example is characterized by including a resin 14 (second resin). The other structures are the same as those of the liquid crystal display device according to the first preferred embodiment (FIGS. 2 to 4) and, therefore, will not be described herein.

The resin 14 is formed to extend from the surface of an electrode 7 formed on a TFT substrate 2 to the surface of a flexible circuit substrate 8. Namely, the resin 14 is formed in such a way as to cover the portions of the electrode 7 and an electrode 9 which are connected to each other. Further, a reinforcement plate 10 is provided in such a way as to cover the resin 14.

In view of the aforementioned facts, it is also possible to provide the same effects as those of the first preferred embodiment, similarly, even with the liquid crystal display device having the structure in the aforementioned modification example.

Further, although, in FIG. 1, there is illustrated a case where the reinforcement plate 10 is formed integrally to extend over the two sides around the flexible circuit substrate 8 provided thereon (its sides in the X-axis direction and in the Y-axis direction in FIG. 1) at the peripheral edge portion of the TFT substrate 2, the reinforcement plate 10 is not limited thereto. For example, as the reinforcement plate 10, it is also possible to provide different reinforcement plates along the respective sides in the X-axis direction and in the Y-axis direction, at the peripheral edge portion of the TFT substrate 2. Further, the reinforcement plates 10 can be also provided in such a way as to cover respective flexible circuit substrates 8, at the peripheral edge portion of the TFT substrate 2. By providing the two or more reinforcement plates 10 at the peripheral edge portion of the TFT substrate 2 as described above, it is possible to facilitate attaching the reinforcement plates 10 to the peripheral edge portion of the TFT substrate 2, thereby improving the accuracy of the attachment thereof.

Second Preferred Embodiment

In the second preferred embodiment of the present invention, as an example of the electro-optical display device, there will be described a touch panel in a touch panel display device, wherein the touch panel display device includes the touch panel provided on a flat-panel display device.

Figure 9:
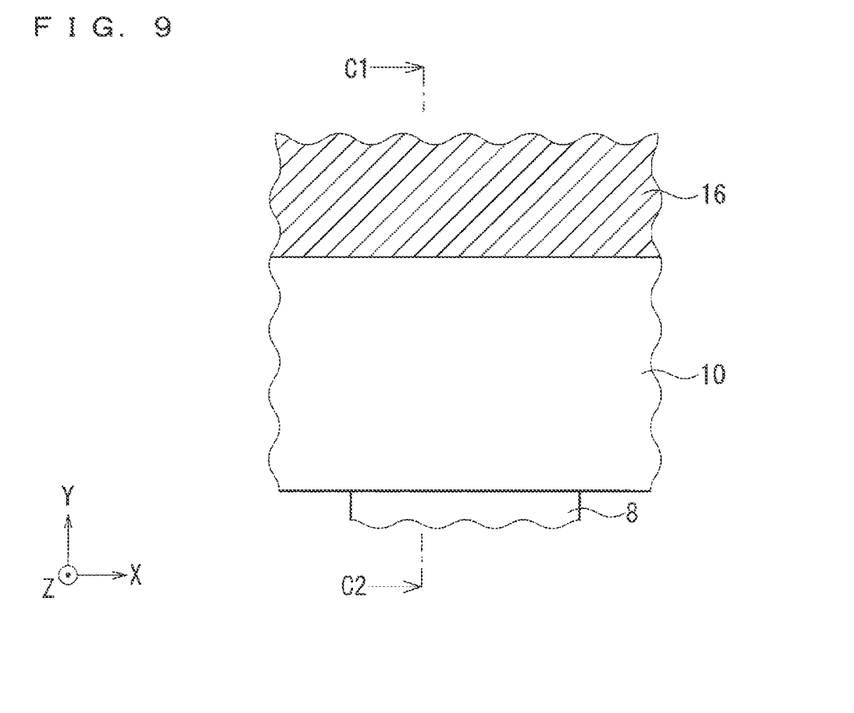
FIG. 9 is a plan view illustrating an example of the structure of a touch panel according to a second preferred embodiment of the present invention.
Figure 10:
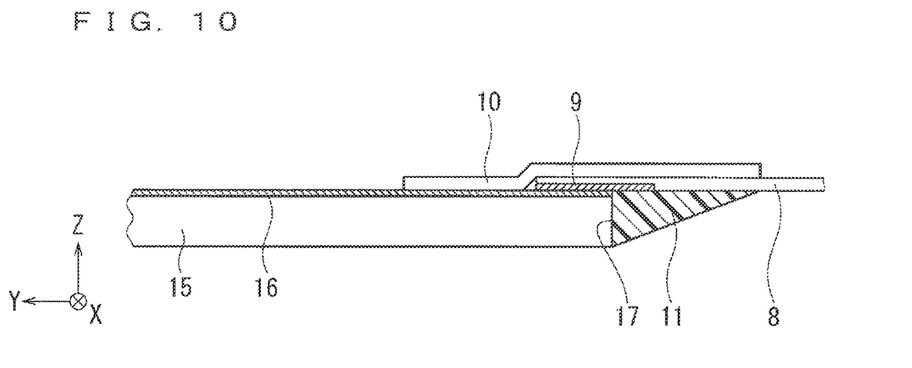
FIG. 10 is a cross-sectional view illustrating the example of the structure of the touch panel according to the second preferred embodiment of the present invention.
Figure 11:
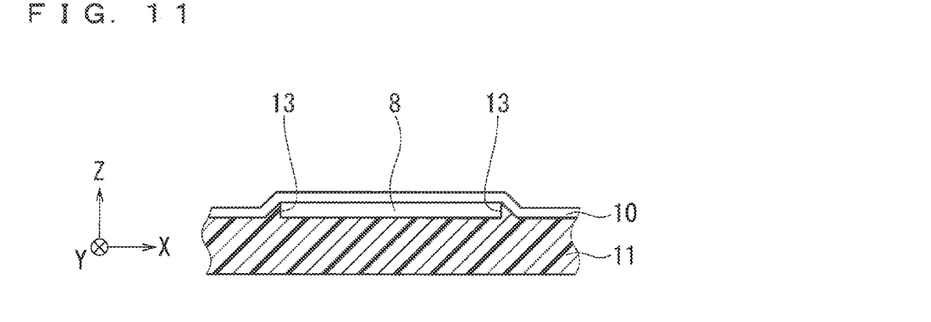
FIG. 11 is a side view illustrating the example of the structure of the touch panel according to the second preferred embodiment of the present invention.

FIG. 9 is a plan view illustrating an example of the structure of a touch panel according to the second preferred embodiment of the present invention, illustrating a portion of the structure of the touch panel. FIG. 10 is a cross-sectional view taken along C1-C2 in FIG. 9. FIG. 11 is a side view in the −Y-axis direction in FIGS. 9 and 10. Further, the same components as those in the first preferred embodiment (FIGS. 1 to 4) are designated by the same reference characters and will not be described in detail.

As illustrated in FIGS. 9 to 11, the touch panel according to the present second preferred embodiment has a touch panel substrate 15, and an electrode 16 (first electrode) formed thereon. A flexible circuit substrate 8 is connected to the electrode 16 formed on the touch panel substrate 15, at an electrode 9 (second electrode) formed at an end portion thereof, and, further, is extended in such a way as to protrude outwardly from the touch panel substrate 15 (in such a way as to protrude in the −Y-axis direction) beyond the peripheral edge portion of the touch panel substrate 15.

Further, the touch panel substrate 15 is mainly formed from a base member, which is an insulating member or the like which contains a glass, a plastic or a resin of a film-type or other types, for example, similarly to the CF substrate 1 and the TFT substrate 2 according to the first preferred embodiment. The electrode 16 is an electric-conductive member made of a metal or the like, similarly to the electrode 7 and the electrode 9 according to the first preferred embodiment.

A reinforcement plate 10 is extended from the touch panel substrate 15 to the flexible circuit substrate 8 in such a way as to cover the portions of the electrode 16 and the electrode 9 which are connected to each other. The reinforcement plate 10 has a width in the X-axis direction which is larger than the width of the flexible circuit substrate 8 in the X-axis direction. Namely, the reinforcement plate 10 is protruded from the flexible circuit substrate 8, at its opposite side surfaces along the direction of the extension thereof (the Y-axis direction).

A resin 11 (first resin) is formed (embedded) to extend over the surface of the flexible circuit substrate 8 which is in the opposite side from the reinforcement plate 10 (in the side in the −Z-axis direction) at its portion protruded from the touch panel substrate 15, the surface of the reinforcement plate 10 which is closer to the flexible circuit substrate 8 at its portion protruded from the flexible circuit substrate 8, and the cut surface 17 of the touch panel substrate 15.

As illustrated in FIGS. 10 and 11, since the reinforcement plate 10 is provided, it is possible to efficiently embed the resin 11 on the cut surface 17 of the touch panel substrate 15 and on the cut surfaces 13 of the flexible circuit substrate 8. More specifically, the resin 11 is directly adhered to both the cut surface 17 of the touch panel substrate 15 and the back surface of the reinforcement plate 10 at its portion protruded from the flexible circuit substrate 8 and, thus, the resin 11 remains thereon, so that the resin 11 forms a resin layer covering the cut surfaces 13 of the flexible circuit substrate 8. Namely, the resin 11 forms a resin layer (protective layer) effective in preventing intrusion of corrosive gas into the electrodes 9 and 16 through the cut surfaces 13 of the flexible circuit substrate 8 or through the adhesion boundary between the resin 11 and the cut surfaces 13 of the flexible circuit substrate 8. Further, preferably, the resin 11 has relatively-higher viscosity, such that it can easily remain extending over the cut surface 17 of the touch panel substrate 15 and the back surface of the reinforcement plate 10 at its portion protruding from the flexible circuit substrate 8.

<Comparative Example>

Next, there will be described a comparative example for explaining effects of the touch panel according to the present second preferred embodiment.

Figure 12:
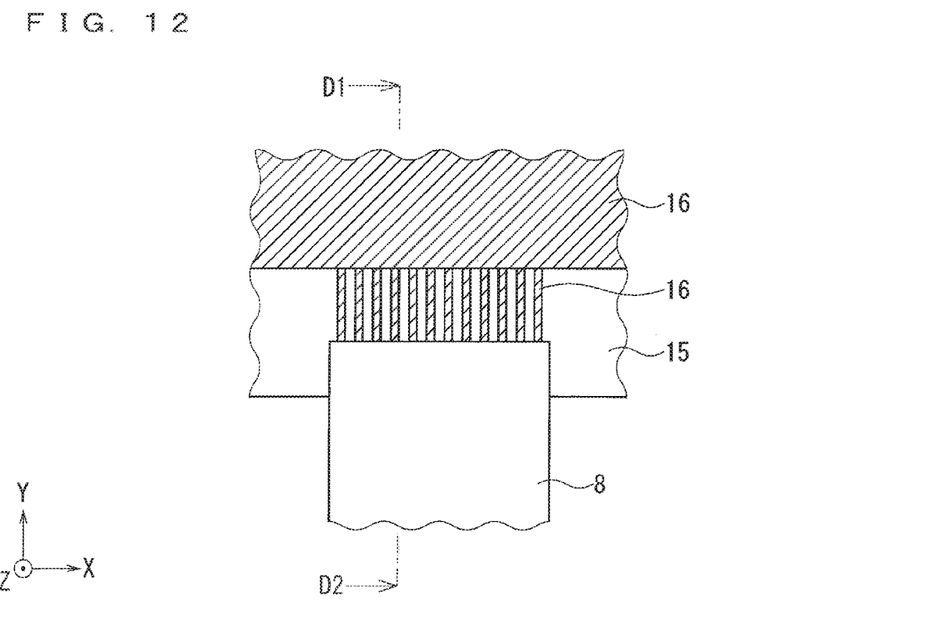
FIG. 12 is a plan view illustrating an example of the structure of a touch panel in a comparative example regarding the second preferred embodiment of the present invention.
Figure 13:
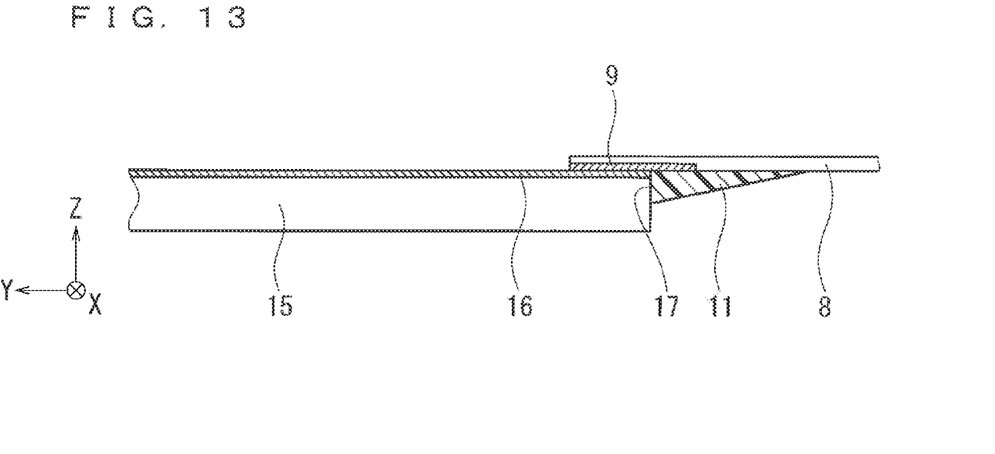
FIG. 13 is a cross-sectional view illustrating the example of the structure of the touch panel in the comparative example regarding the second preferred embodiment of the present invention.
Figure 14:
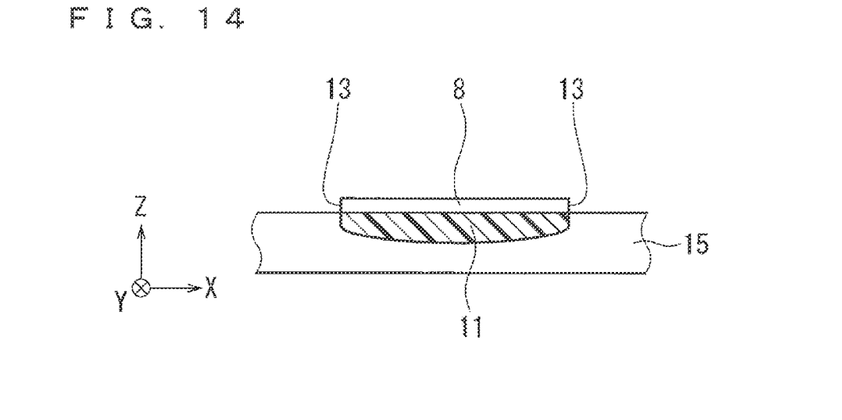
FIG. 14 is a side view illustrating the example of the structure of the touch panel in the comparative example regarding the second preferred embodiment of the present invention.

FIG. 12 is a plan view illustrating an example of the structure of a touch panel in the comparative example. FIG. 13 is a cross-sectional view taken along D1-D2 in FIG. 12. FIG. 14 is a side view in the −Y axis direction in FIGS. 12 and 13.

As illustrated in FIGS. 12 to 14, in the comparative example, a reinforcement plate 10 as illustrated in FIGS. 9 to 11 is not provided. Accordingly, a resin 11 is formed in such a way as to cover only the surface of a flexible circuit substrate 8 in its back surface side (in the side in the −Z-axis direction), thereby bringing the flexible circuit substrate 8 into the state of being exposed at its cut surfaces 13. Further, in the comparative example, it is impossible to cause the resin 11 to efficiently remain on the cut surface 17 of a touch panel substrate 15, which makes it impossible to prevent intrusion of corrosive gas into electrodes 9 and 16 through the cut surfaces 13 of the flexible circuit substrate 8 or through the adhesion boundary between the resin 11 and the cut surfaces 13 of the flexible circuit substrate 8.

In view of the aforementioned fact, according to the present second preferred embodiment, since the reinforcement plate 10 is provided in such a way as to cover the portion of the electrode 16 formed on the touch panel substrate 15 and the portion of the electrode 9 formed in the flexible circuit substrate 8 which are connected to each other, and in such a way as to protrude from the flexible circuit substrate 8, it is possible to cause the resin 11 to remain being sufficiently embedded on the cut surfaces 13 of the flexible circuit substrate 8, which can efficiently prevent intrusion of corrosive gas into the electrodes 9 and 16 through the cut surfaces 13 of the flexible circuit substrate 8. Accordingly, it is possible to suppress degradation of the quality of the display on the electro-optical display device (the touch panel display device in the present second preferred embodiment).

Further, since the reinforcement plate 10 is provided in such a way as to protrude from the flexible circuit substrate 8, the resin 11 embedded on the cut surface 17 of the touch panel substrate 15 can easily remain thereon, which causes the resin 11 to have an increased thickness, thereby efficiently preventing intrusion of corrosive gas into the electrodes 9 and 16 through the cut surfaces 13 of the flexible circuit substrate 8.

Further, since the reinforcement plate 10 is provided in such a way as to cover the portions of the electrode 16 and the electrode 9 which are connected to each other, the reinforcement plate 10 functions as a protective layer for protecting the surface of the flexible circuit substrate 8, thereby preventing intrusion of corrosive gas through the surface of the flexible circuit substrate 8.

<Modification Example>

Next, an example of modification of the present second preferred embodiment will be described.

Figure 15:
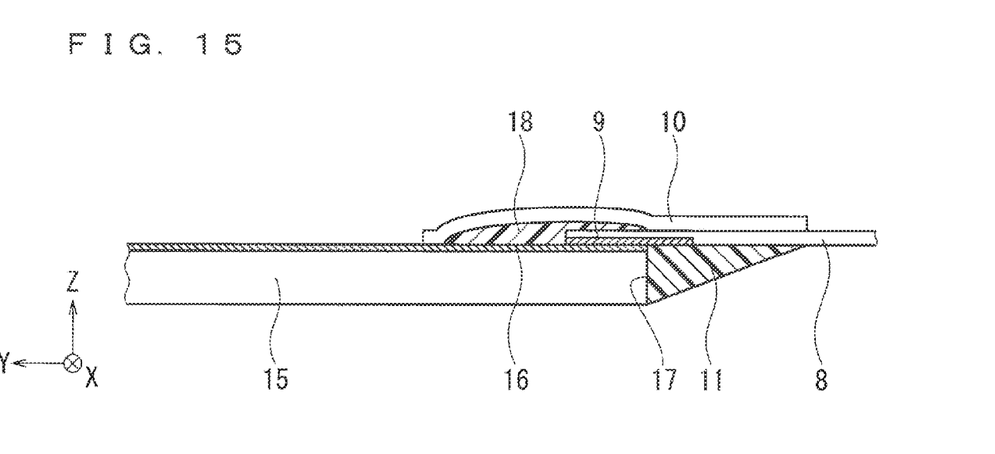
FIG. 15 is a cross-sectional view illustrating the example of the structure of the touch panel in the modification example regarding the second preferred embodiment of the present invention.

FIG. 15 is a cross-sectional view illustrating an example of the structure of a touch panel in the modification example. Further, FIG. 15 corresponds to FIG. 10.

As illustrated in FIG. 15, the touch panel in the modification example is characterized in including a resin 18 (second resin). The other structures are the same as those of the touch panel according to the present second preferred embodiment (FIGS. 9 to 11) and, therefore, will not be described herein.

The resin 18 is formed to extend from the surface of an electrode 16 formed on a touch panel substrate 15 to the surface of a flexible circuit substrate 8. Namely, the resin 18 is formed in such a way as to cover the portions of the electrode 16 and an electrode 9 which are connected to each other. Further, a reinforcement plate 10 is provided in such a way as to cover the resin 18.

In view of the aforementioned facts, it is also possible to provide the same effects as those of the second preferred embodiment, similarly, even with the touch panel having the structure in the aforementioned modification example.

Further, in the present invention, it is possible to arbitrarily combine the respective preferred embodiments and, also, it is possible to properly made modifications and eliminations to the respective preferred embodiments, within the scope of the invention.

While the invention has been shown and described in detail, the foregoing description is in all aspects illustrative and not restrictive. It is therefore understood that numerous modifications and variations can be devised without departing from the scope of the invention.

What is claimed is:

1. An electro-optical display device comprising:
   a substrate having a peripheral edge portion on which a first electrode is formed;
   a flexible circuit substrate extended in such a way as to protrude outwardly from said substrate beyond said peripheral edge portion of said substrate, wherein a second electrode is formed at an end portion of said flexible circuit substrate and is connected to said first electrode;

a reinforcement plate which is extended from said substrate to said flexible circuit substrate in such a way as to cover portions of said first electrode and said second electrode which are connected to each other at said portions and, further, is protruded from said flexible circuit substrate at its opposite side surfaces along a direction of this extension; and a first resin formed to extend over a portion of a surface of said flexible circuit substrate which is in an opposite side from said reinforcement plate and is protruded from said substrate, a portion of a surface of said reinforcement plate which is closer to said flexible circuit substrate and is protruded from said flexible circuit substrate, and an end surface of said substrate.

2. The electro-optical display device according to claim 1, further comprising a second resin formed in such a way as to cover portions of said first electrode and said second electrode which are connected to each other, wherein said reinforcement plate is formed in such a way as to cover said second resin.

3. The electro-optical display device according to claim 2, wherein said substrate comprises a TFT (Thin Film Transistor) substrate.

4. The electro-optical display device according to claim 2, wherein said substrate comprises a touch panel substrate.

5. The electro-optical display device according to claim 1, wherein said substrate comprises a TFT (Thin Film Transistor) substrate.

6. The electro-optical display device according to claim 1, wherein said substrate comprises a touch panel substrate.

\* \* \* \* \*